March 17, 1931.  E. J. SWEETLAND ET AL  1,796,492
SUBMERGED CONTINUOUS FILTER
Filed Feb. 16, 1927  4 Sheets-Sheet 1
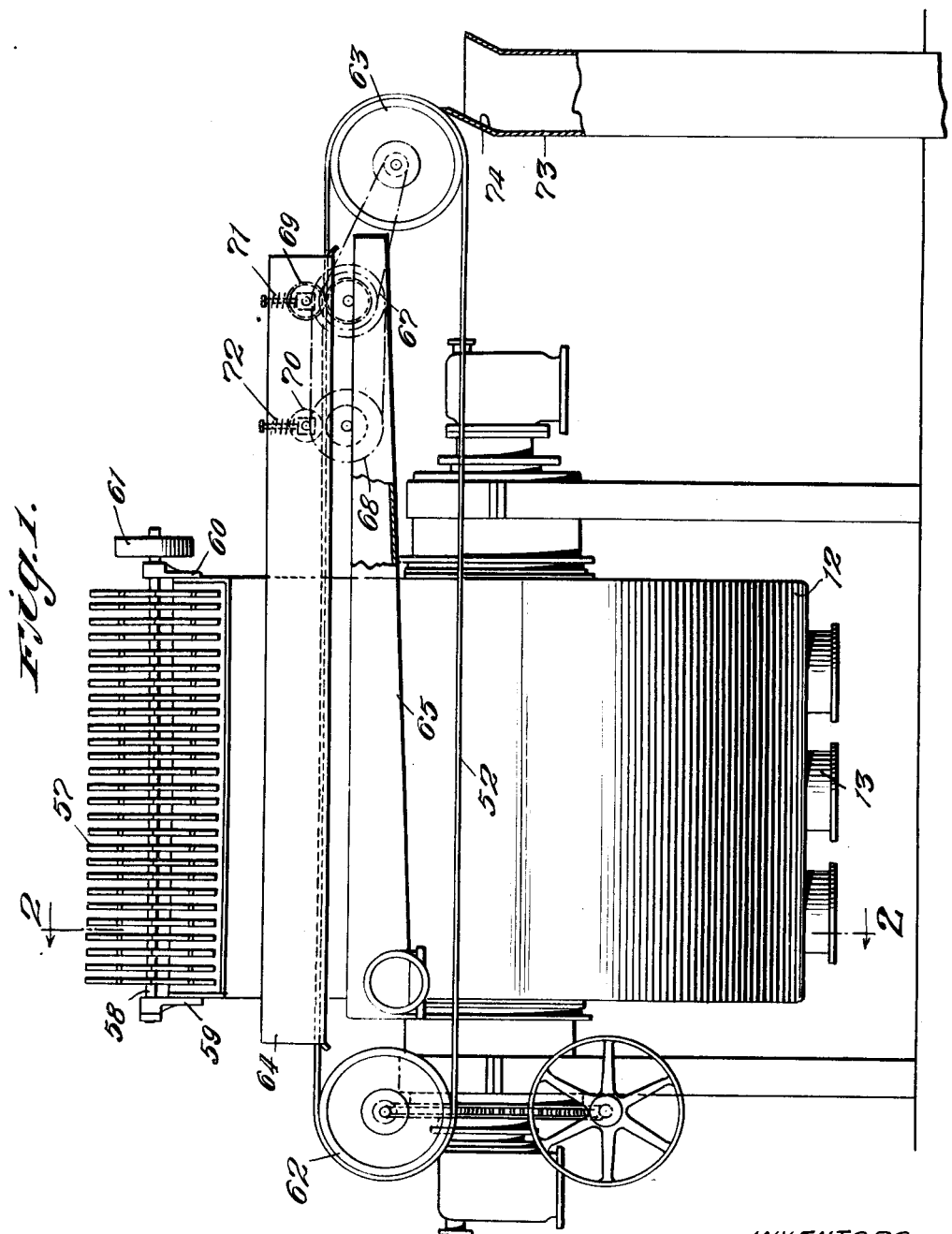
INVENTORS
Ernest J. Sweetland
John T. Hoyt
BY Joseph V. Zentmoefer
Hammond & Littell
ATTORNEYS

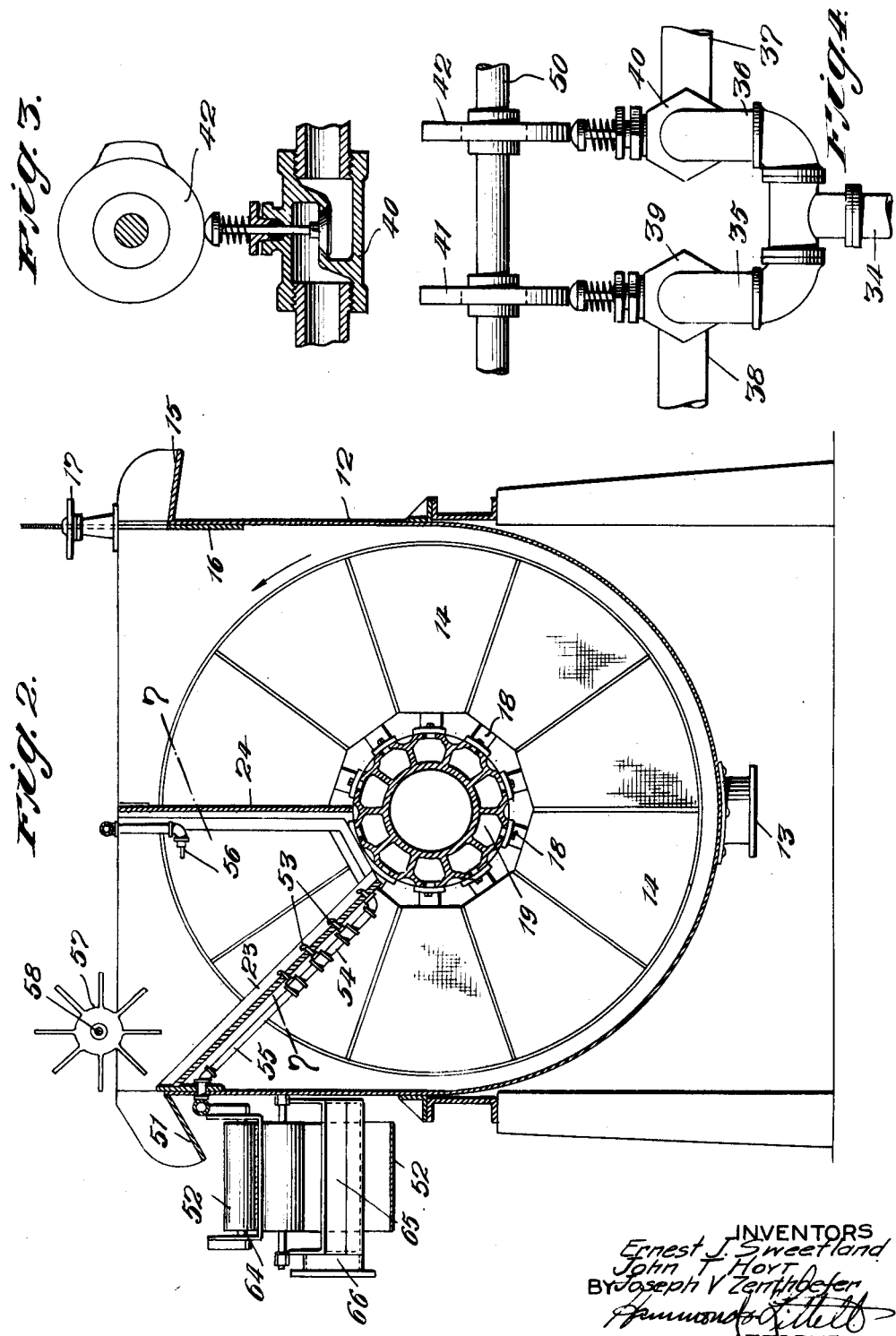

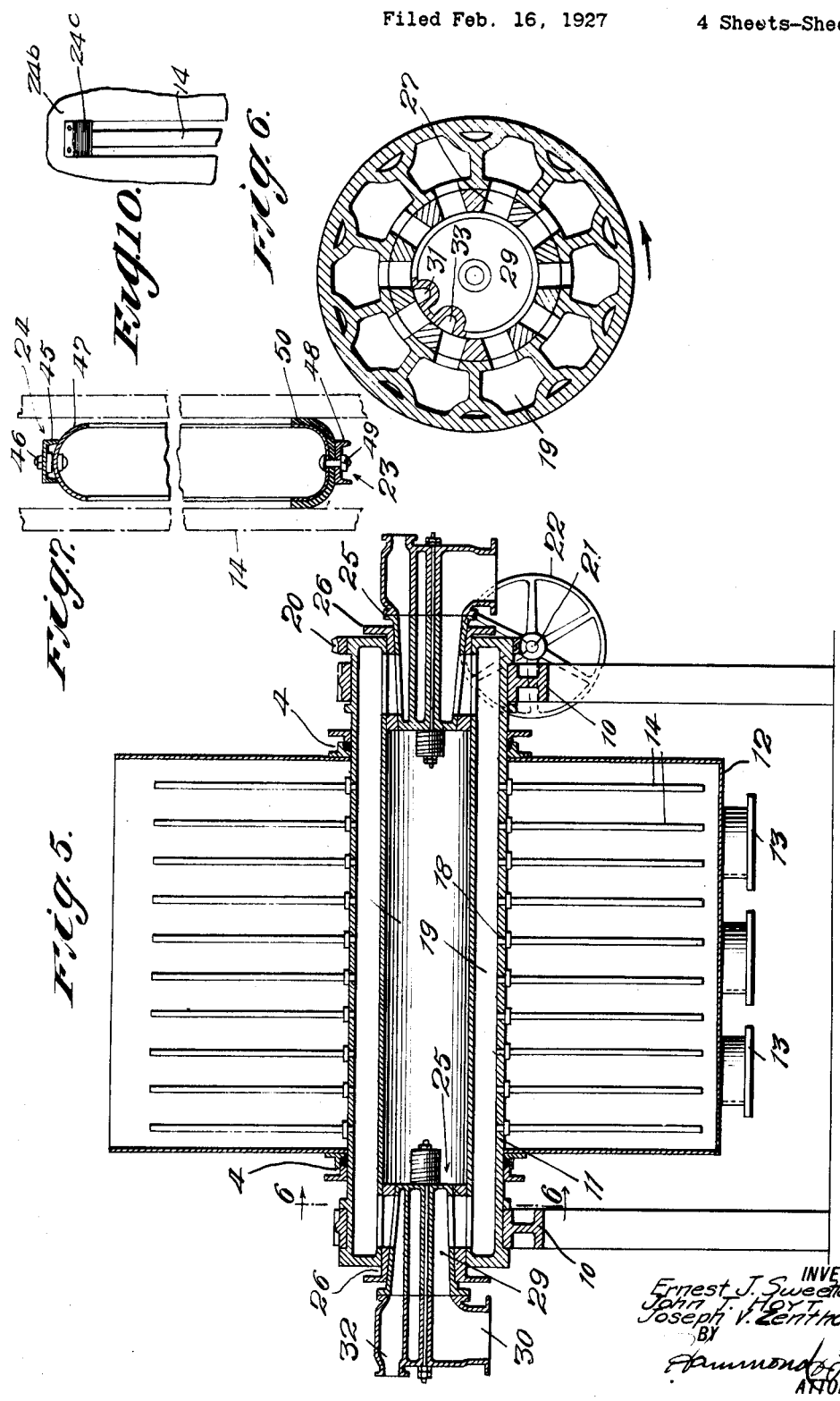

March 17, 1931.  E. J. SWEETLAND ET AL  1,796,492
SUBMERGED CONTINUOUS FILTER
Filed Feb. 16, 1927  4 Sheets-Sheet 4

INVENTORS
Ernest J. Sweetland
John T. Hoyt
Joseph V. Zenthoefer
BY
ATTORNEYS

Patented Mar. 17, 1931

1,796,492

UNITED STATES PATENT OFFICE

ERNEST J. SWEETLAND, JOSEPH V. ZENTHOEFER, AND JOHN T. HOYT, OF HAZLETON, PENNSYLVANIA, ASSIGNORS, BY MESNE ASSIGNMENTS, TO OLIVER UNITED FILTERS INC., OF SAN FRANCISCO, CALIFORNIA, A CORPORATION OF NEVADA

SUBMERGED CONTINUOUS FILTER

Application filed February 16, 1927. Serial No. 168,528.

This invention relates to filters, and especially to the type of filters adapted for continuous operation. Such filters may comprise one or more disk shaped elements, provided with filter surfaces and adapted for rotation about a horizontal axis, or they may be of a drum or cylinder type rotating in a suitable sludge tank. In a type of filter which finds extensive use the filter disks or drum are supported over a tank adapted to contain the liquid from which a solid or fibrous substance is to be removed by filtration, in such a way that only the lower part of the filter disks or drum is submerged in the liquid usually to a point only slightly above the axis of rotation. The space within the filter disks or "leaves" communicates with a suitable vacuum apparatus, so that the liquid is drawn through the filter surface leaving a deposit or cake of the solid or fibrous material upon the surface. In the rotation of the filter leaves the upwardly moving sides thereof emerge from the liquid coated with the solid or fibrous cake, which is removed therefrom at a suitable position over the liquid tank, leaving the surface which moves downwardly into the tank clean and ready to receive another deposit of solid or fibrous material.

For some uses such filters present certain defects and disadvantages. They are relatively inefficient, inasmuch as not over half, and generally less than half, of the filter surface is in operation at any time, the part which is not submerged in the liquid being necessarily idle. The cloudy filtrate which may pass through the filtering surface during the first few seconds of filtration is unduly large in comparison to the total amount of filtrate produced in one cycle of operation. The vacuum within the filter leaves is substantially reduced by air passing thru the filter cake on the unsubmerged part of the filter leaves. The passage of air thru the filter may be otherwise undesirable, where a moist cake is desired, since it substantially dehydrates the filtrate. In the recovery of wood pulp for paper manufacture, for example, it has been necessary to at once "repulp" the cake by adding more water thereto.

The present invention, a representative embodiment of which is shown in the accompanying drawings, contemplates a filter which comprises among its advantages the elimination of the defects and disadvantages of previous filters, a few of which have been briefly mentioned above.

It will be seen therefore that one of the important objects of the present invention is to provide a continuous filter of the drum or disk type in which substantially the entire filtering area is submerged in the sludge at all times to provide a continuous filter utilizing to the utmost the effective filtering area thereof.

Another object of the invention is to provide a submerged filter of the type described making the utmost use of the vacuum supplied.

Other objects and advantages incidental to this will appear as the description of the invention proceeds.

In the drawings which illustrate in particular a disk or leaf type filter:

Figure 1 is a longitudinal elevation of a filter containing one embodiment of the present invention.

Figure 2 is a transverse sectional elevation, substantially on the line 2—2 of Figure 1.

Figure 3 is a sectional detail of an air valve and its controlling cam.

Figure 4 is an elevation of the fluid pressure and vacuum valves and their controlling devices.

Figure 5 is a substantially central longitudinal section thru the filter.

Figure 6 is an enlarged transverse section of one of the plug valves, substantially on the line 6—6 of Figure 5.

Figure 7 is a section substantially on the line 7—7 of Figure 2.

Figure 10 is a detail view along the line 10—10 of Figure 8 illustrating the construction of the separation compartment.

Figure 8:
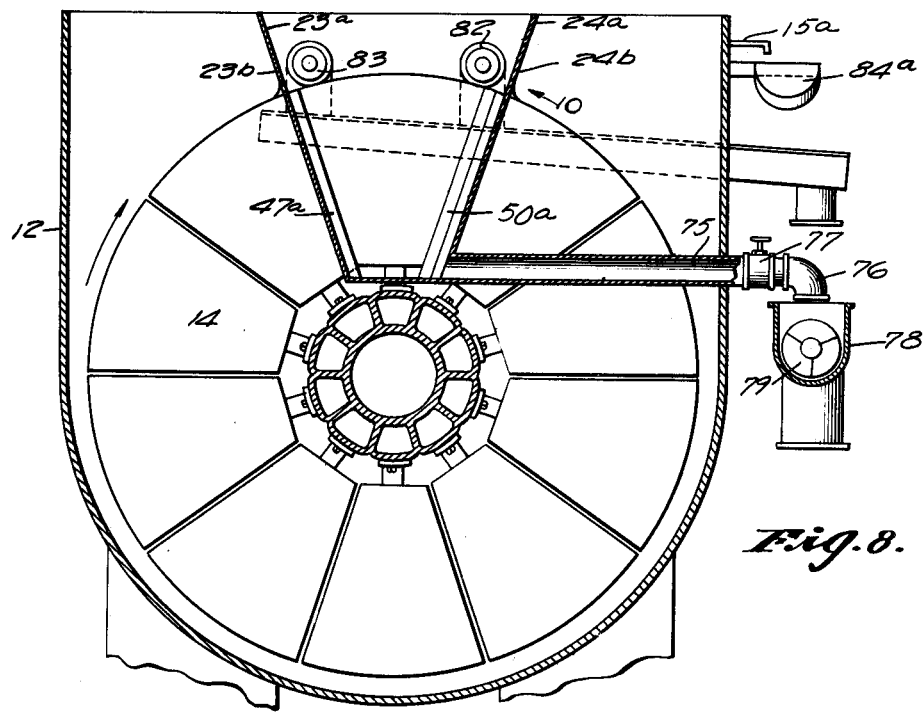
Figure 8 is a view similar to Figure 2 showing a modified form of construction.

The disk or leaf filter shown in the preferred embodiment of the invention is supported in a suitable frame which furnishes bearing supports 10 for the filter leaf supporting shaft 11 and the sludge or pulp tank 12. Stuffing boxes 4 prevent leakage of the liquid around the shaft. The liquid to be filtered enters the tank 12 thru the openings 13, a plurality of such openings being provided to insure even distribution to all the filter disks of the large volume of the liquid which passes thru the filter. As seen in Figure 2 the walls of the tank 12 extend a short distance above the top of the filter disks 14, and an overflow apron or trough 15 is provided near the top of one side of the tank. For maximum efficiency it is desirable that the liquid in the tank be maintained at a constant level, and accordingly a slight continuous overflow is contemplated. The level of liquid is controlled by a plate 16, adjacent to the overflow apron 15, which is adjustable vertically by means of nuts 17.

The filter disks 14 may be of any known or desired construction. Preferably, however, they are divided into sector shaped parts, each part constituting a separate filter element, surfaced with perforated filter plates, wire cloth, wire screen or other suitable filtering medium. The interior of each filter sector communicates through a passage 18 with a longitudinal compartment 19 of the hollow shaft upon which the filter disks are fixed for rotation. The elements of successive filter disks are in longitudinal alignment, and the elements of each row communicate with the same compartment 19, there being one such compartment for each row of elements.

The filter disk supporting shaft may be rotated by any suitable driving mechanism, such as a worm gear 20, fixed to the shaft and meshing with a worm 21 connected to a pulley 22, driven from a suitable source of power. Means are provided for removing the filter cake from the filter surfaces comprising a sector shaped compartment somewhat wider than the sector elements, and bounded by walls 23 and 24 (Fig. 2), or 23ª and 24ª (Fig. 8) located between the sectors and extending across each sector at the outer edge thereof as indicated at 23ᵇ and 24ᵇ, which means will be hereinafter more fully described. Since the operation of the apparatus contemplates drawing water through the filter surfaces throughout their rotation except at the point of removal of the filter cake, it will be apparent that a vacuum should be maintained in all of the compartments 19 except the one connected with the filter elements or sector from which the cake is being removed. To facilitate removal of the cake it is expedient not only that the vacuum in each element be relieved as it reaches the point of removal, but that an internal pressure be created instead of the vacuum. Moreover, in the filtration of such materials as wood pulp, a certain amount of short fiber pulp and wood flour will pass through the freshly cleaned filter surface, but will be retained after the surface has become coated with fiber cake. A clear filtrate is thus secured only after the formation of a thin filter cake. It is therefore expedient to provide means for separating the filtrate which passes thru the freshly cleaned filter surface from that which passes after the formation of a thin cake.

To accomplish these desirable results, the outlets from the elongated passages 19 are constructed and controlled as follows. A rotary type of valve having a stationary plug, designated generally by reference numeral 25, is fitted into a sleeve 26, fixed in the end of the shaft 11. For greater efficiency such a sleeve and valve may be placed in each end of the shaft. The two being similar one only will be described. Said sleeve comprises a plurality of peripheral ports 27, registering with ports 28 in the valve plug 25. The stationary valve comprises a large compartment 29, through which the clear filtrate is drawn off, said compartment being in communication thru the connection 30 with any suitable vacuum producing apparatus.

The ports 27 open into the compartment 29 throughout the major part of the rotation of the shaft 11 and filter disks carried thereby. Adjacent to the filter cake removing compartment, however, the plug valve is provided with a passage 31, which is connected through outlet 32 with fluid pressure controlling devices which will presently be described. The arrangement is such that passage 31 communicates with the passage 19 of the filter elements which occupy the filter cake removing compartment.

As hereinbefore stated, it is desirable that the cloudy filtrate which passes through the filter immediately following the removal of the cake therefrom be separated from the clear filtrate which passes after a thin filter cake has been formed. To this end the plug valve 25 comprises, adjacent to the filter cake removal passage 31, a passage 33, separated from the main compartment 29, for the reception of the first or cloudy filtrate. Said passage is preferably connected to separate vacuum apparatus, from which the cloudy filtrate is returned to the process, and subsequently refiltered. By the time each port 27 has moved out of registry with passage 33 and into communication with the compartment 29 its corresponding filter element has been sufficiently coated with filter cake to yield a clear filtrate. While the cloudy filtrate port 33 improves the clarity of the filtrate it must be understood that it is not essential to the present structure, since the cloudy filtrate period bears a low ratio to the clear filtrate period due to the larger filtering period and hence the total cloudy filtrate per cycle is not sufficient to cause a material waste in the present apparatus.

In effecting the detachment of the filter cake from the filter in the removal compartment by a reversal of pressure as hereinbefore mentioned, it has been found that a more effective and complete separation of the cake from the filter surface is accomplished by a sharp and sudden application of pressure within the filter element in the separation compartment than is effected by a gradual application of pressure, such as could be made by the use of a pressure source controlled by the relatively slow opening valves 25. It has also been found that by applying pressure suddenly, separation of the cake from the filter is accomplished very rapidly, permitting the use of a relatively small zone or section only of the filter disk for discharging the filter cake, and leaving a correspondingly large fraction of the filter constantly in use for filtering. It is also desirable, for reasons which will presently appear, that a vacuum be maintained in each filter element or sector while it is entering the cake removal compartment. To these ends, special pressure controlling devices communicate with the passage 31, which may be constructed as follows:

The outlet 32 from passage 31 is connected through a tube 34 (Fig. 4) and the branch pipes 35 and 36 with both a pipe 37 containing fluid under pressure, and a pipe 38 in which a vacuum is maintained. In the connections to pipes 37 and 38 are placed similar spring valves 39 and 40 controlled respectively by cams 41 and 42 fixed to the cam shaft 50 which is arranged to be driven in synchronism with the filter shaft 11, and to perform one complete revolution while the filter shaft rotates through the arc of one filter sector. The arrangement of wells and eccentric surfaces on the cams 41 and 42 is such that as each sector approaches the removal compartment valve 39 to the vacuum line is opened and remains open until the sector is fully within the removal compartment. Valve 39 is then closed, and immediately thereafter valve 40 is quickly opened, suddenly applying pressure within the sector and quickly blowing or detaching the filter cake therefrom. As new sectors advance into the chamber 23—24, valve 40 is closed and valve 39 reopened, to repeat the operation upon the next advancing sector. An effective and rapidly operating filter cake detaching means is thus provided.

It will be noted (Fig. 6) that the spacing of passages 31 and 33 and the cam arrangement is such that the sector leaving the cake removal compartment does not come in communication with the vacuum in passage 33 until it has passed entirely out of the removal compartment, thus there is no tendency for the cake to again attach to the sector.

The means for the removal of the filter cake from the compartment may be constructed as follows: The removal compartment comprises substantially radial partitions 23 and 24, extending between adjacent filter disks and spaced apart a distance slightly greater than the width of a sector. Partition 24 comprises a supporting channel 45 to which is secured by suitable means such as bolts 46, a flexible arcuate closing member 47 of a yielding material such as elastic rubber or thin sheet phosphor bronze. Since the filter cake must pass this partition on entering the removal compartment, the longitudinal edges of member 47 are spaced from the filter surfaces, are inclined in the direction of movement of the filter surfaces, and yield quite easily under pressure to permit passage of the filter disks without materially disturbing the cake thereon.

Partition 23 comprises a supporting channel 48 to which is secured by bolts 49 or other suitable means an arcuate closing member 50 whose edges are inclined against the movement of the filter surfaces, and contact therewith to act as scrapers for completing the removal of the filter cake and preventing passage of the thickened cake therethrough. This closing member 50 is preferably somewhat more rigid than member 40, but is still sufficiently yielding to conform to any unevenness in the filter disk surfaces.

The filter cake accumulated in the removal compartment contains some water, and is quite fluid in character although very much thicker than the original sludge or pulp introduced into the tank 12. The continued removal of the cake from the filter leaves tends to raise the level of the fluid filter cake in the removal compartment, causing it to overflow at the spout 51, onto the screen conveyor 52. The movement of the filter cake toward the spout 51 may be assisted by jets of air or water suitably directed and positioned within the removal compartment. A series of jet nozzles are shown at 53, located adjacent the partition 23, and extending thru said partition to a manifold 54 connected with a supply pipe 55. One or more auxiliary fluid jet nozzles 56 may be located adjacent to the partition 24, or in any other desirable or convenient location. The application of pressure to these jets is preferably controlled by a suitable automatic valve similar to 40 to apply the pressure fluid in intermittent sudden puffs. If desired, the removal of the filter cake from the compartment may be further facilitated by a series of narrow paddle wheels 57 located adjacent the discharge spout 51, so as to sweep the solid pulp therefrom but permit the water to remain in the compartment. The paddle wheels are shown as fixed on a shaft 58, supported in brackets 59 and 60, and driven by a pulley 61.

The continuous screen conveyor 52 passes around the rollers 62 and 63, at opposite sides of the tank 12, one of which may be driven by suitable means. The upper reach of the conveyor, which receives the pulp or other filter cake passes through and is supported by a perforated trough 64, and an inclined drip trough 65 having an outlet 66 is arranged below to receive the water which drips through the screen conveyor. When a rather dry filter cake is desired, one or more pairs of squeeze rolls may be placed adjacent to the discharge end of the conveyor. Two such sets, comprising respectively lower rolls 67 and 68, and upper rolls 69 and 70 have been illustrated, roll 67 being driven from the conveyor roll 63, and roll 68 being driven from roll 67. The upper rolls 69 and 70 may be properly weighted to extract the desired amount of moisture, or may be controlled by adjustable springs 71 and 72. The consistency of the material finally discharged from the apparatus may thus be accurately regulated.

The material discharged from the end of the screen conveyor is received in a hopper, the removal of any substance adhering to the conveyor being effected by scraper blade 74.

Figure 9:
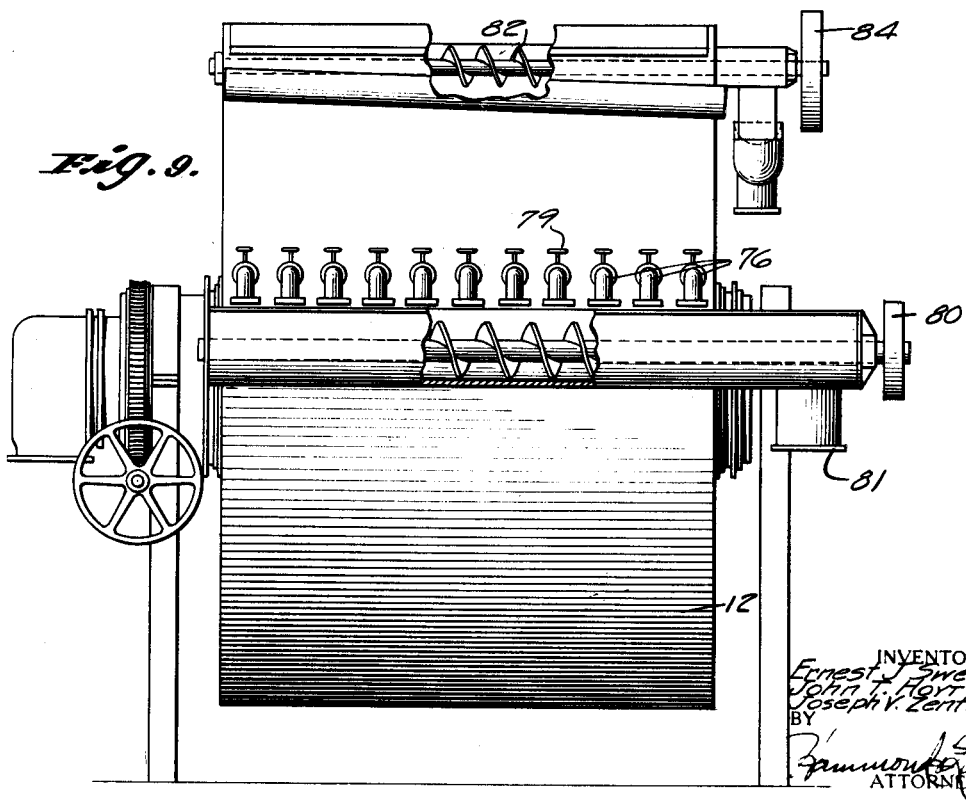
Figure 9 is a side elevation, partially in section, of the modified construction of Figure 8.

In the alternative form of a discharge means illustrated in Figs. 8 and 9 the pulp compartment bounded by the walls 23a and 24a is located in a vertical position and is of such size as to receive slightly more than one sector 14. The construction and arrangement of the side walls 47a and the closing member 50a is substantially identical with that illustrated in Fig. 7.

The filter sector 14 when completely within the compartment is subjected to a sudden reverse air pressure by the means illustrated in Figs. 3 and 4 to dislodge the cake therefrom and on continued rotation, any cake adhering to the sides of the filter sector is scraped away by the closing member 50a. Extending from the bottom of each compartment 23a—24a is a pipe or conduit 75 which projects thru the wall of the tank 12 and is provided with a discharge outlet 76 which may be controlled by means of a valve 77. A trough 78 receives the pulp discharged from the nozzle 76 and is provided with a suitable conveyor 79 driven from the pulley 80 to convey the pulp to one side of the tank 12 where it may be discharged thru the outlet 81, so that by suitably regulating the valves 77 the thickened pulp in the discharge compartment may be permitted to flow continuously from the filter.

Under certain conditions it may be desirable to discharge the thickened pulp from adjacent the top of the discharge compartment and for this purpose a pair of screw conveyors 82 and 83 driven from any suitable source by means of pulleys 84 may be provided. One at each side of the compartment above the filter disc (the walls of the compartment 23a—24a extended from one compartment outside the said filter disc). By this means the thickened pulp is conveyed to the side of the tank 12 and discharged therefrom. In some instances, as when filtering a thick pulp it may be necessary to use both the discharge conduits 75 and the conveyors 82 and 83 for the purpose of removing the pulp from the discharge compartment as rapidly as it accumulates therein.

A trough 84a for conveying the discharge from the over-flow nozzle 15a to the desired point is indicated in Fig. 8.

As indicated more clearly in Fig. 10 the walls of the discharge compartments 23—24 and 23a—24a meet outside the filter discs, providing a portion 24b which closes the top of the discharge compartment to the liquid in the pulp compartment. A suitable flexible flap 24c may be used to assist in preventing the pulp liquid from flowing into the discharge compartment.

The operation of the device, which has been set forth in some detail in connection with the description of the mechanism, may be summarized as follows:

The mixture of liquid and solids to be filtered is introduced into the tank 12 through a plurality of inlet openings 13, a constant level in the tank being maintained by supplying liquid at a rate which will maintain a slight continuous overflow from the overflow outlet 15, which is controlled by the vertically adjustable plate 16. The filter disks, rotating within the tank 12, are entirely or substantially submerged, rendering a high percentage of their surface constantly available for filtration purposes. The filter cake, accumulated on the filter elements in their movement, by maintaining a vacuum within them, is removed in the removal compartments defined by partitions 23 and 24, by suddently applying pressure to the interior of the element in the removal compartment, the edges of the partition 23 acting as scrapers to complete its removal. The fluid filter cake accumulated in the removal compartment of Figure 2 is discharged through spout 51, which is located slightly above the level of the overflow spout 15 assisted by suitably directed fluid jets 53 and 56, or by a paddle wheel 57, or by both these instrumentalities, or as in Figures 8 and 9 by the conduits 75 or the conveyors 82 and 83 or by both these means. The cake thus discharged is received on a screen belt conveyor 52, and may be partially dried in suitable squeeze rolls, after which it passes into the receiving hopper 73, having substantially the consistency desired for its use.

The cloudy filtrate from the freshly cleaned filter surfaces is received in the passage 33, to be returned to the process.

For use in the recovery of pulp fibers from the mill effluent or white water of the paper mill, or at any other stage of the paper making process, a relatively dilute sludge or pulp stock is introduced into the filter containing only a fraction of one per cent. of pulp fiber, and the filter cake discharged may contain three to five per cent or more of solid pulp. Inasmuch as the pulp is returned to the paper stock vat, a dry pulp is not usually desired, so that the concentrated, but still fluid pulp, cake has the advantage that it can be added directly to the pulp vat without repulping.

It will be seen, therefore, that our apparatus is designed efficiently to handle large amounts of dilute pulp liquor and to concentrate or thicken the same and recover the pulp in ready condition for reuse.

The static head of the liquid surrounding the filter surfaces, the utilization of substantially all the surface for filtering and the more efficient use of the vacuum gives a very much greater comparative efficiency over the prior type of continuous filters and in addition, the number of disks per unit of shaft length may be substantially increased due to the change in the cake removing means, all these improvements affording a very large effective filtering area in a very small floor space.

While a typical embodiment of the invention in the form of a leaf type filter has been illustrated and described in some detail, this embodiment is to be understood as illustrative rather than restrictive, the inventions being readily susceptible of embodiment in the form of a drum type filter as shown in the copending application Ser. No. 156,846, filed December 24, 1926, and in other forms, all falling within the scope of the appended claims.

What is claimed is:

1. A vacuum filter comprising a tank, a filter element contained in said tank, means for effecting the accumulation of a filter cake on surface of said filter element, means for effecting the removal of said filter cake comprising a separate compartment within said tank and open through the top thereof in which said filter cake is accumulated and from which it is continuously discharged, and means to elevate the accumulated cake in said compartment over the top of the tank.

2. A vacuum filter comprising a tank containing a liquid to be filtered, a filter element contained in said tank, means for effecting the accumulation of a filter cake on the surface of said filter element, means for effecting the removal of said filter cake from said tank comprising a filter cake accumulating compartment located within said tank and below the surface in said tank of the liquid to be filtered and open through the top of the tank, and means for continuously removing the filter cake from said compartment, including a paddle wheel to elevate the accumulated filter cake and to discharge it over the side of the tank.

3. In a rotating disk filter, filter cake removing means comprising a compartment defined by stationary partition walls extending substantially radially between adjacent filter disks, the partition wall past which the filter disks move into said compartment comprising edge portions which are yieldable in the direction of movement of the filter disks.

4. In a rotating disk filter, filter cake removing means comprising a compartment defined by stationary partition walls extending substantially radially between adjacent filter disks, the partition wall past which the filter disks move into said compartment comprising edge portions which are yieldable in the direction of movement of the filter disks, and the edges of the opposite partition wall forming scrapers in contact with the surface of the filter disks.

5. In a rotating disk filter, means for removing cake from the surfaces of the filter disks comprising a compartment defined by stationary partitions extending between adjacent filter disks, one of said partitions contacting with the surfaces of the filter disks and another of said partitions being spaced from the surfaces of the filter disks to permit the passage of filter cake into said compartment.

6. In a continuous operation filter comprising a rotary disk divided into sector shaped filter elements, means for removing filter cake from the surfaces of said filter elements comprising a compartment defined by radial partitions adjacent to the face of said disk and spaced apart a distance slightly greater than the width of one of said sectors, said compartment being near the top of the tank.

7. In a continuous operation filter comprising a rotary disk divided into sector shaped filter elements, means for removing filter cake from the surface of said filter elements comprising a compartment defined by radial partitions adjacent to the face of said disk and spaced apart a distance slightly greater than the width of one of said sectors, and means for suddenly applying fluid pressure within the sector contained in said compartment including a cam actuated quick opening valve.

8. In a filter comprising a filter tank and a rotary filter disk divided into sector shaped filter elements, means for normally maintaining a vacuum in each of said elements, a filter cake removing compartment at the top of said tank of a width adapted to contain one of said elements only, means for maintaining the vacuum in each filter element as it enters said compartment, and means for suddenly applying fluid pressure within each element as it comes to a position entirely within said compartment, and means to remove the filter cake from said compartment over the top of said tank.

9. In a filter comprising rotary disk filter elements adapted to accumulate a filter cake, means for removing said filter cake comprising a filter cake accumulating compartment having a discharge opening formed by the faces of adjacent filter disks and radial partitions extending between the faces of adjacent disks, and a plurality of fluid jets opening within said compartment and adapted to propel the filter cake in said compartment toward said discharge opening.

10. In a filter comprising a tank containing a rotating filter disk adapted to accumulate filter cake, means for removing said filter cake from said tank without recontaminating the rest of the pulp comprising a sector shaped compartment formed by the sides of adjacent disks and radial partitions extending between the faces of adjacent disks through which successive areas of said filter disk passes, fluid pressure means acting on said filter disks while in said compartment to discharge the filter cake from its surface, and fluid jet means having outlets within said compartment adapted to facilitate the removal of accumulated filter cake therefrom.

11. In a continuous suction filter comprising a tank containing segmental filter elements adapted to be substantially completely submerged in the liquid to be filtered, means for causing an accumulation of filter cake in a discharge compartment adjacent the top of said tank, said compartment embracing but a single segment of an element, a discharge outlet for said filter cake in the top of the tank at substantially the level of the free surface of the liquid to be filtered, and means comprising a rotating paddle wheel for facilitating the movement of said filter cake through said discharge outlet.

12. In an apparatus of the class described the combination of a continuous filter, a filter element, a filter casing adapted to surround said filter element, said casing being filled with filter pulp substantially covering said filter element, a filter shaft supporting said filter element, conduits in said shaft in communion with said filter element, vacuum means to form a cake on said element, said filter element being divided into a plurality of segments, means for successively removing cake from said elements as each in turn arrives in a definite position, said means including a valve adapted when opened to connect the source of fluid pressure with the interior of the segment in cake-removing position, quick-actuating means for suddenly opening said valve at appropriate points in the revolution of said filter element, a compartment cooperating with a single segment of said filter element and adapted to receive the discharged cake from each of the segments of said filter element as they pass adjacent thereto, and fluid pressure jets adapted to remove the cake from said compartment over the top of said casing.

13. In a continuous filter of the class described, a combination of a rotating disk, a filter medium on said disk, an open filter casing surrounding said disk, and extending above the top thereof, means for maintaining a filter pulp in said casing at a level such that the disk is substantially submerged, means for rotating said disk, means for forming a filter cake on the surface thereof during substantially the entire cycle of revolutions, a filter pulp compartment adjacent the top of said tank and means for removing filter cake from the disk in said compartment, means for elevating the removed cake from said compartment above the surface of the liquid in said casing and discharging it over the side of said casing.

14. In an apparatus of the class described the combination of a continuous rotary disk filter, a filter casing adapted to surround and support said filter disk, said casing being filled with filter pulp substantially covering said disk, a filter shaft supporting said filter disk, conduits in said shaft in communication with said disk, means to withdraw filtrate from said disk and to form a cake on the surface thereof during substantially the entire cycle of revolution, a cake-receiving compartment adjacent the top of said casing and said disk and quick-actuating valve mechanism to periodically interrupt said cake-forming mechanism and to cause a blowback pressure on said cake and elevating means for elevating the filter cake from said compartment over the top of the casing.

15. In an apparatus of the class described means for increasing the efficiency of a continuous filter for thickening pulp which comprises a filter casing, means to maintain said casing substantially full of filter pulp to be thickened, a filter medium substantially submerged in said casing, means to form a filter cake on said filter medium, a discharge compartment, means to discharge the filter cake in said compartment from said filter medium below the surface of said filter pulp and fluid jets in said compartment adapted to discharge said filter pulp over the side of said tank from said compartment.

16. In a continuous filter of the class described a filter casing, a filter shaft mounted in said casing, segmental filter disks supported on said filter shaft adapted to be rotated thru said casing, means to supply filter pulp to said casing and to maintain the level above the top of said filter disks, means to form a filter cake on said filter disks, cake-receiving compartments between said disks and embracing a single segment of said disks, means to discharge said filter cake in said compartment and means to remove the filter cake from said compartment without recontaminating the rest of the pulp including fluid pressure jets in said compartment adapted to discharge the filter cake over the side of said casing.

17. In a continuous rotary filter of the class described the combination of a rotating disk filter element, a casing surrounding said filter element, means to submerge said element in filter pulp, means to form a filter cake of high water content and fluid consistency and means to remove the accumulated cake from the filter surface below the surface of the liquid in the casing including a cake-discharging compartment adjacent the top of the tank and a paddle wheel mounted on the top of said tank and adapted to force the filter pulp from said compartment over the top of said casing.

In testimony whereof we have affixed our signatures to this specification.

ERNEST J. SWEETLAND.
JOSEPH V. ZENTHOEFER.
JOHN T. HOYT.